(12) United States Patent
Luo et al.

(10) Patent No.: US 8,756,457 B2
(45) Date of Patent: Jun. 17, 2014

(54) OVER-CURRENT PROTECTION SYSTEM OF AND METHOD THEREOF

(75) Inventors: Yu-Hao Luo, Taipei (TW); Chun-Lung Hsiao, Taipei (TW); Cheng-Wei Chang, Taipei (TW)

(73) Assignee: Wistron Corporation, New Taipei (TW)

( * ) Notice: Subject to any disclaimer, the term of this patent is extended or adjusted under 35 U.S.C. 154(b) by 286 days.

(21) Appl. No.: 13/310,278

(22) Filed: Dec. 2, 2011

(65) Prior Publication Data

US 2013/0042133 A1 Feb. 14, 2013

(30) Foreign Application Priority Data

Aug. 11, 2011 (TW) ............................... 100128768 A

(51) Int. Cl.
*G06F 11/00* (2006.01)
(52) U.S. Cl.
USPC ............................................ 714/22; 713/300
(58) Field of Classification Search
USPC .......................................................... 714/22
See application file for complete search history.

(56) References Cited

U.S. PATENT DOCUMENTS

| 7,554,409 | B1 * | 6/2009 | Zhang et al. | 330/298 |
|---|---|---|---|---|
| 8,065,539 | B2 * | 11/2011 | Kasprzak et al. | 713/300 |
| 8,423,804 | B2 * | 4/2013 | Li et al. | 713/300 |
| 8,484,489 | B2 | 7/2013 | Wu et al. | |
| 2010/0026274 | A1 * | 2/2010 | Chang et al. | 323/344 |
| 2010/0106983 | A1 * | 4/2010 | Kasprzak et al. | 713/300 |
| 2011/0187337 | A1 * | 8/2011 | Lin et al. | 323/282 |
| 2011/0258477 | A1 * | 10/2011 | Baker et al. | 713/600 |
| 2012/0191988 | A1 * | 7/2012 | Li et al. | 713/300 |
| 2012/0311352 | A1 * | 12/2012 | Luo et al. | 713/300 |

FOREIGN PATENT DOCUMENTS

TW 201028836 A1 8/2010

\* cited by examiner

*Primary Examiner* — Kamini Patel
(74) *Attorney, Agent, or Firm* — Muncy, Geissler, Olds & Lowe, P.C.

(57) ABSTRACT

An over-current protection system used in a computer system is disclosed. The computer system includes a current supply module, a processor, and a battery. The over-current protection system commands the processor to disable its boost state if a first current generated by the current supply module when the processor is in the boost state is greater than a second current affordable by the current supply module.

8 Claims, 6 Drawing Sheets

OVER-CURRENT PROTECTION SYSTEM OF AND METHOD THEREOF

BACKGROUND OF THE INVENTION

1. Field of the Invention

The present invention relates to an over-current protection system. More particularly, the present invention relates to an over-current protection system which uses a hardware circuit to accomplish the over-current protection.

2. Description of the Related Art

The prior art has disclosed that a CPU can be under a boost state to enhance the computing performance. For example, Intel has researched a CPU which uses the turbo boost to enhance the computing performance; however, the better computing performance consumes more power. For example, if a 65 W current converter works with a 35 W processor and a 30 W system, then when the turbo boost mode is disabled, the total consumption of the processor and system is 65 W. However, when the turbo boost mode is enabled, the total consumption of the processor and system is greater than 65 W, and the current converter is overloaded; as a result, the system and the current converter may be damaged. Therefore, to protect the system and the current converter, when the current converter is overloaded, the system will stop charging the battery and use the charging system to send a signal to the microcontrollers of the system, after which the microcontrollers will send a signal to the processor, allowing the processor to disable the turbo boost mode as over-current protection.

However, in the abovementioned mechanism, the process of the microcontrollers to send a signal to the processor is controlled by the software of the microcontrollers; therefore, if the system or the software breaks down, the system will not be able to start the abovementioned over-current protection, with the result that the current converter or the system may be overheated and thus damaged.

Therefore, there is a need to provide an over-current protection system which uses the hardware circuit to accomplish the over-current protection, and a method thereof, to solve the disadvantage of the prior art.

SUMMARY OF THE INVENTION

It is an object of the present invention to provide an over-current protection system that uses a hardware circuit to accomplish the over-current protection.

It is another object of the present invention to provide a computer system that uses the abovementioned over-current protection system.

It is another object of the present invention to provide an over-current protection method that uses a hardware circuit to accomplish the over-current protection.

To achieve the abovementioned objects, the over-current protection system of the present invention is applied to a computer system, wherein the computer system includes a current supply module, a processor, and a battery. When the processor is under the boost state, and generates a first current that is greater than a second current affordable by the current supply module, the over-current protection system commands the processor to disable its boost state. The over-current system includes a charge module and a protection circuit. The charge module is electrically connected to the current supply module for charging the battery. The charge module includes a detection element for detecting the first current generated by the current supply module when the processor is under the boost state; if the first current is greater than the second current affordable by the current supply module, the charge module stops charging the battery and generates a signal. The protection circuit is electrically connected to the charge module; when the processor is under the boost state such that the first current increases and becomes greater than the second current affordable by the current supply module, the protection circuit transmits the signal generated by the charge module to the processor, to command the processor to disable the boost state.

According to an embodiment of the invention, the over-current protection system of the present invention further includes a control module connected electrically to the charge module and the processor. The control module is used for transmitting the signal generated by the charge module to the processor to command the processor to disable the boost state.

According to the first embodiment of the invention, the over-current protection system of the present invention includes a resistor, a first transistor, and a second transistor. The resistor is electrically connected to the current supply module; the first transistor includes a first gate, a first source, and a first drain. The first gate is electrically connected to the charge module, and the first source is earthed, and the first drain is electrically connected to the resistor. The second transistor includes a second gate, a second source, and a second drain. The second gate is electrically connected to the resistor, and the second source is earthed, and the second drain is electrically connected to the processor.

According to the second embodiment of the invention, the protection circuit of the present invention includes an AND gate, and the AND gate includes a first connecting end, a second connecting end, and a third connecting end. The first connecting end is electrically connected to the charge module, and the second connecting end is electrically connected to the current supply module, and the third connecting end is electrically connected to the processor.

The over-current protection method of the invention is applied to a computer system, wherein the computer system includes a current supply module, a processor, and a battery. The over-current protection method is used to command the processor to disable its boost state if the first current generated by the current supply module under the boost state enabled by processor increases and becomes greater than the second current affordable by the current supply module. The over-current protection method includes the steps of: providing a charge module for charging the battery and electrically connecting to the current supply module; detecting the first current generated by the current supply module via the charge module when the processor enables the boost state, and if the first current becomes greater than the second current affordable by the current supply module, stopping charging the battery and generating a signal; providing a protection circuit electrically connected to the processor; transmitting the signal generated by the charge module to the processor via the protection circuit to command the processor to disable the boost state if the processor enables the boost state such that the first current increases and becomes greater than the second current affordable by the current supply module.

According to another embodiment of the invention, after the step in which the charge module stops charging the battery and generates the signal, the over-current protection method further includes the step of providing a control module electrically connected to the charge module and the processor for transmitting the signal to the processor, to command the processor to disable the boost state.

According to the first embodiment of the invention, the step of providing the protection circuit further including the steps of: providing a resistor electrically connected to the current supply module; providing a first transistor, which includes providing a first gate electrically connected to the charge module, providing a first source which is earthed, and providing a first drain electrically connected to the resistor; providing a second transistor, which includes providing a second gate electrically connected to the resistor, providing a second source which is earthed, and providing a second drain electrically connected to the processor.

According to the second embodiment of the invention, the step of providing the protection circuit of the present invention further includes the steps of providing an AND gate, which includes the steps of providing a first connecting end electrically connected to the charge module, providing a second connecting end electrically connected to the current supply module, and providing a third connecting end electrically connected to the processor.

DETAILED DESCRIPTION OF THE PREFERRED EMBODIMENT

These and other objects and advantages of the present invention will become apparent from the following description of the accompanying drawings, which disclose several embodiments of the present invention. It is to be understood that the drawings are to be used for purposes of illustration only, and not as a definition of the invention.

Figure 1:
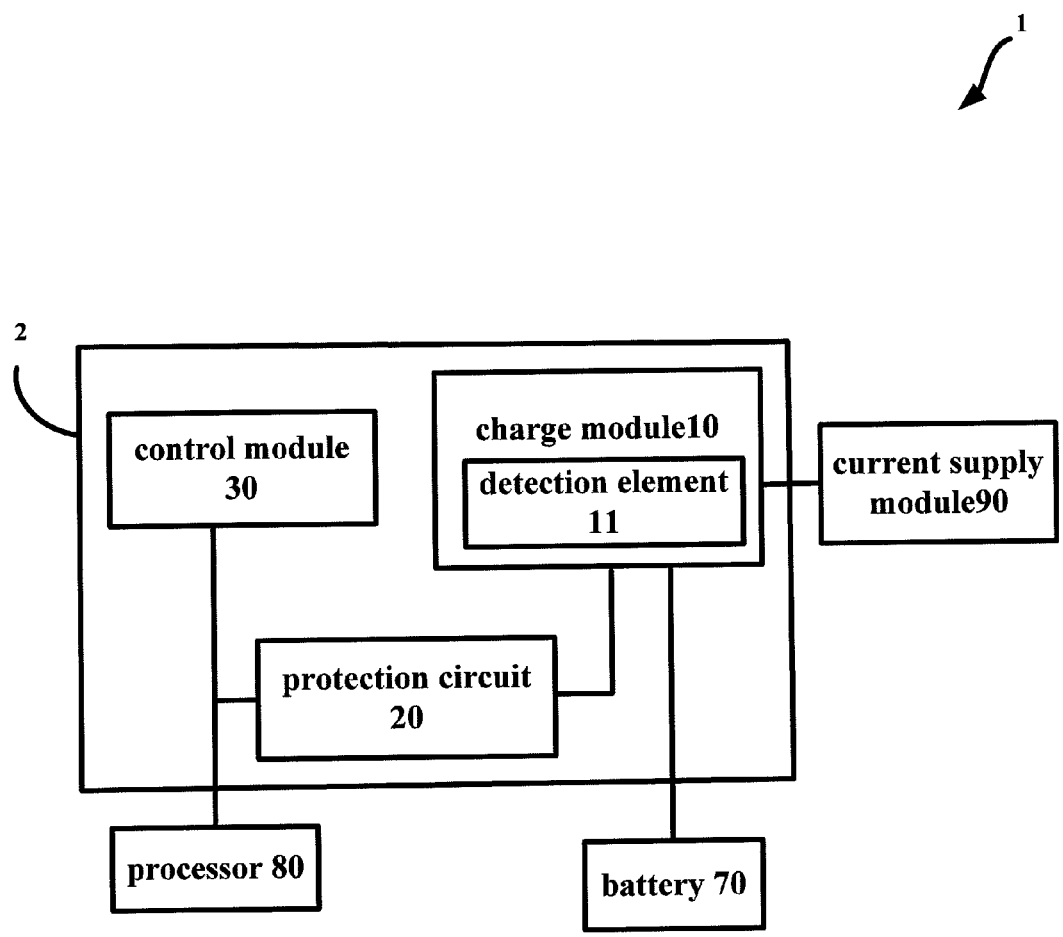
FIG. 1 illustrates a system structure drawing of the computer system and the over-current protection system of the invention.

Please refer to FIG. 1, which illustrates a system structure drawing of the computer system and the over-current protection system of the invention. As shown in FIG. 1, the over-current protection system 2 is applied to the computer system 1. In one embodiment of the invention, the computer system 1 includes a current supply module 90, a processor 80, a battery 70, and an over-current protection system 2. When the processor 80 enables the boost state and generates a first current that increases and becomes greater than a second current affordable by the current supply module 90, the over-current protection system 2 commands the processor 80 to disable its boost state. In one embodiment of the present invention, the computer system 1 is a notebook; however, the present invention is not limited to this application. Furthermore, the boost state enabled by the processor 80 is disclosed in the prior art, and is well known in the field on the present invention, so there is no need for further description here.

In an embodiment of the invention, the over-current system 2 of the invention includes a charge module 10, a protection circuit 20, and a control module 30.

The charge module 10 is electrically connected to the current supply module 90 for charging the battery 70. The charge module 10 includes a detection element 11 used for detecting the first current generated by the current supply module 90 under the boost state enabled by the processor 80. If the first current becomes greater than the second current affordable by the current supply module 90, the charge module 10 stops charging the battery 70 and generates a signal.

The protection circuit 20 is electrically connected to the charge module 10. When the processor 80 enables the boost state such that the first current increases and becomes greater than the second current affordable by the current supply module 90, the protection circuit 20 will transmit the signal generated by the charge module 10 to the processor 80, to command the processor 80 to disable the boost state.

The control module 30 is electrically connected to the charge module 10 and the processor 80, and is used for transmitting the signal to the processor 80, to command the processor 80 to disable the boost state.

Figure 2:
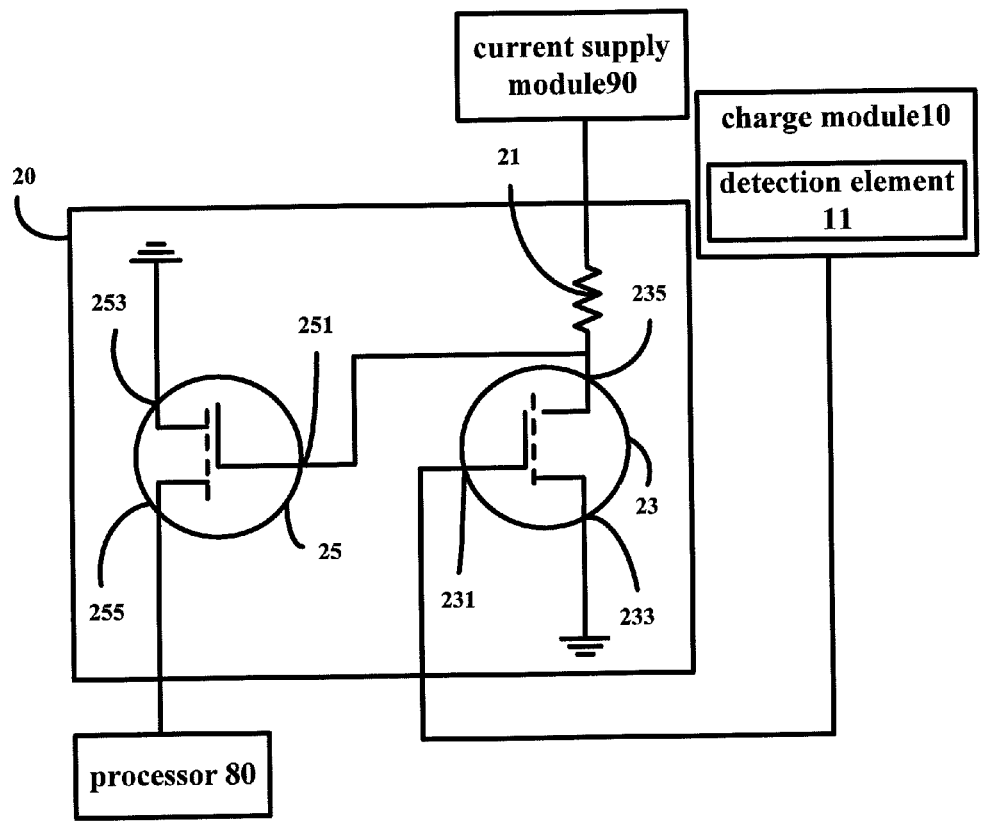
FIG. 2 illustrates a circuit schematic drawing of the protection circuit according to the first embodiment of the invention.

Please refer to FIG. 2, which illustrates a circuit schematic drawing of the protection circuit according to the first embodiment of the invention.

As shown in FIG. 2, in the first embodiment of the invention, the protection circuit 20 includes a resistor 21, a first transistor 23, and a second transistor 25. In one embodiment of the present invention, the first transistor 23 and the second transistor 25 are metal-oxide-semiconductor field-effect transistors; however, the present invention is not limited to this application.

The resistor 21 is electrically connected to the current supply module 90. The first transistor 23 includes a first gate 231, a first source 232, and a first drain 233, wherein the first gate 231 is electrically connected to the charge module 10, the first source 232 is earthed, and the first drain 233 is electrically connected to the resistor 21. The second transistor 25 includes a second gate 251, a second source 252, and a second drain 253, wherein the second gate 251 is electrically connected to the resistor 21, the second source 252 is earthed, and the second drain 253 is electrically connected to the processor 80.

It is to be understood that the first transistor 23 and the second transistor 25 of the present invention are actuated in a low electric potential, which means that the first transistor 23 and the second transistor 25 can be activated when the first gate 231 and the second gate 251 have a low electric potential. Therefore, in the present embodiment, when the over-current system 2 is in a normal situation, the first gate 231 and the processor 80 both have a high electric potential, such that the first transistor 23 is not activated. The second transistor 251 is in high electric potential because of the current provided by the current supply module 90. When the detection element 11 detects that the processor 80 enables the boost state, allowing the first current generated by the current supply module 90 to be greater than the second current affordable by the current supply module 90, the charge module 10 stops charging the battery 70, to reduce the required current for the system (which means reducing the first current), and then the charge module 10 generates a signal of low electric potential; the signal allows the first gate 231 to have a low electric potential, such that the first transistor 23 is activated; because the first transistor 23 is activated, and the first source 233 is earthed, allowing the current provided by the current supply module 90 to conduct to earth, such that the second gate 251 has a low electric potential; because the second source 253 is earthed and the second transistor 25 is activated, the second drain 255 has a low electric potential, allowing the processor 80 to have a low electric potential; therefore, the signal of the low electric potential can be delivered to the processor 80. When the processor has a low electric potential, the boost state will be disabled.

Figure 3:
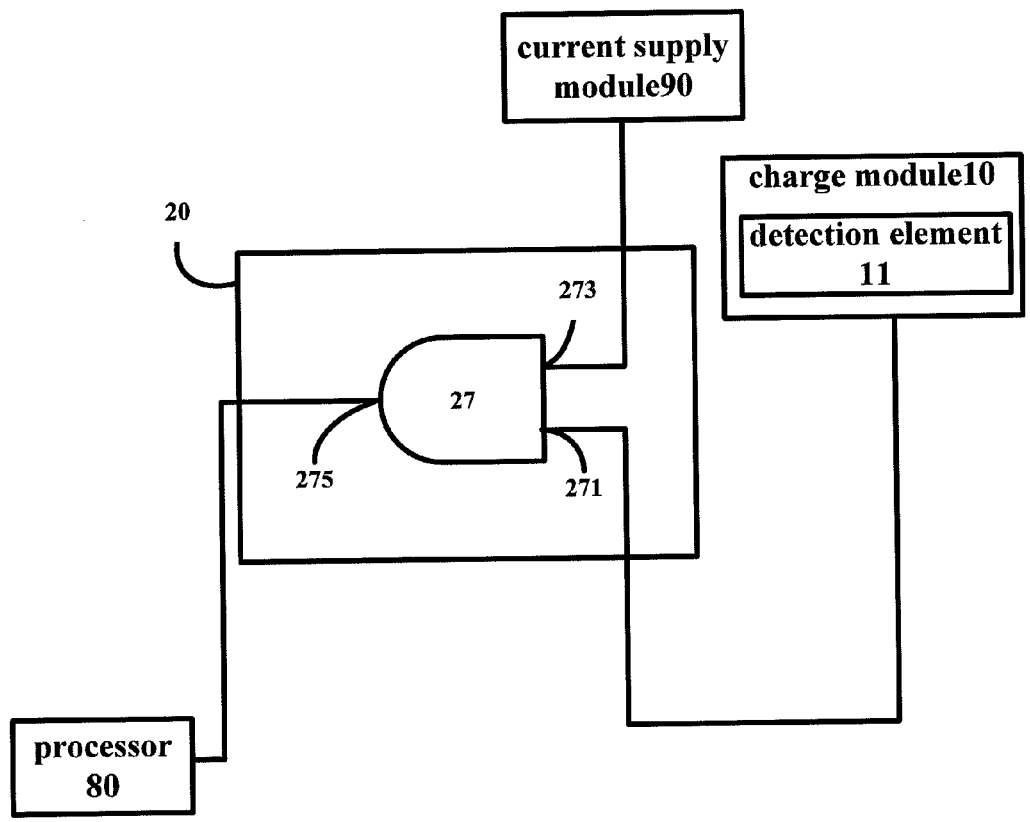
FIG. 3 illustrates a circuit schematic drawing of the protection circuit according to the second embodiment of the invention.

Please refer to FIG. 3, which illustrates a circuit schematic drawing of the protection circuit according to the second embodiment of the invention.

As shown in FIG. 3, in the second embodiment of the invention, the protection circuit 20 includes an AND gate which includes a first connecting end 271, a second connecting end 273, and a third connecting end 275.

The first connecting end 271 is electrically connected to the charge module 10; the second connecting end 273 is electrically connected to the current supply module 90; the third connecting end 275 is electrically connected to the processor 80. When the computer system 1 is in a normal state, the first connecting end 271 has a high electric potential, and the second connecting end 273 is connected to the current supply module 90 and thus maintains a high electric potential, allowing the third connecting end 275 to have a high electric potential (1·1 exports 1), such that the processor 80 maintains a high electric potential. When the signal of low electric potential generated by the charge module 10 is delivered to the first connecting end 271, the third connecting end 275 will have a low electric potential (1·0 exports 0), allowing the signal of the low electric potential to be delivered to the processor 80, to command the processor 80 to disable the boost state.

It is to be understood that the abovementioned embodiment is only for illustration of the protection circuit 20 of the invention; however, the protection circuit 20 of the invention is not limited to that design.

Figure 4:
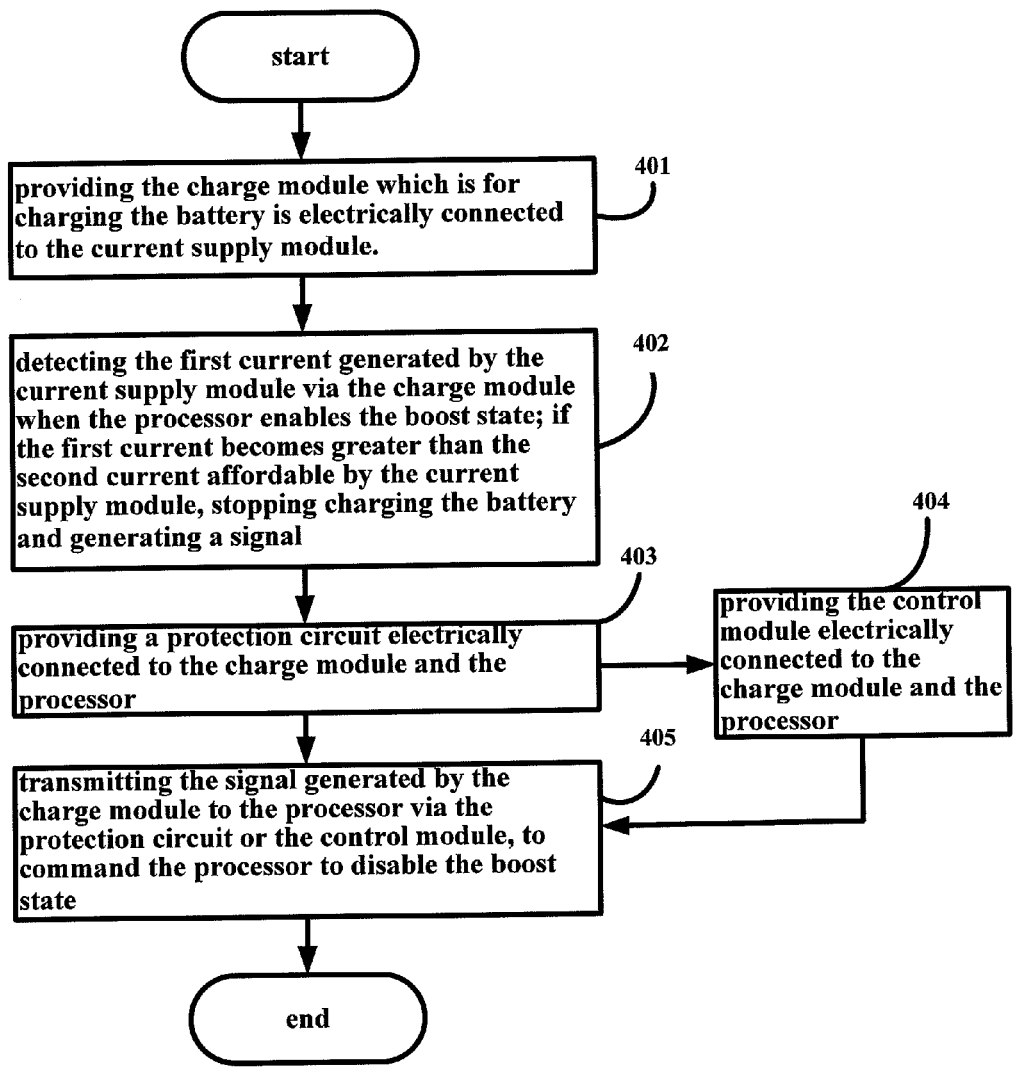
FIG. 4 illustrates a flowchart of the steps of the over-current method of the invention.
Figure 5:
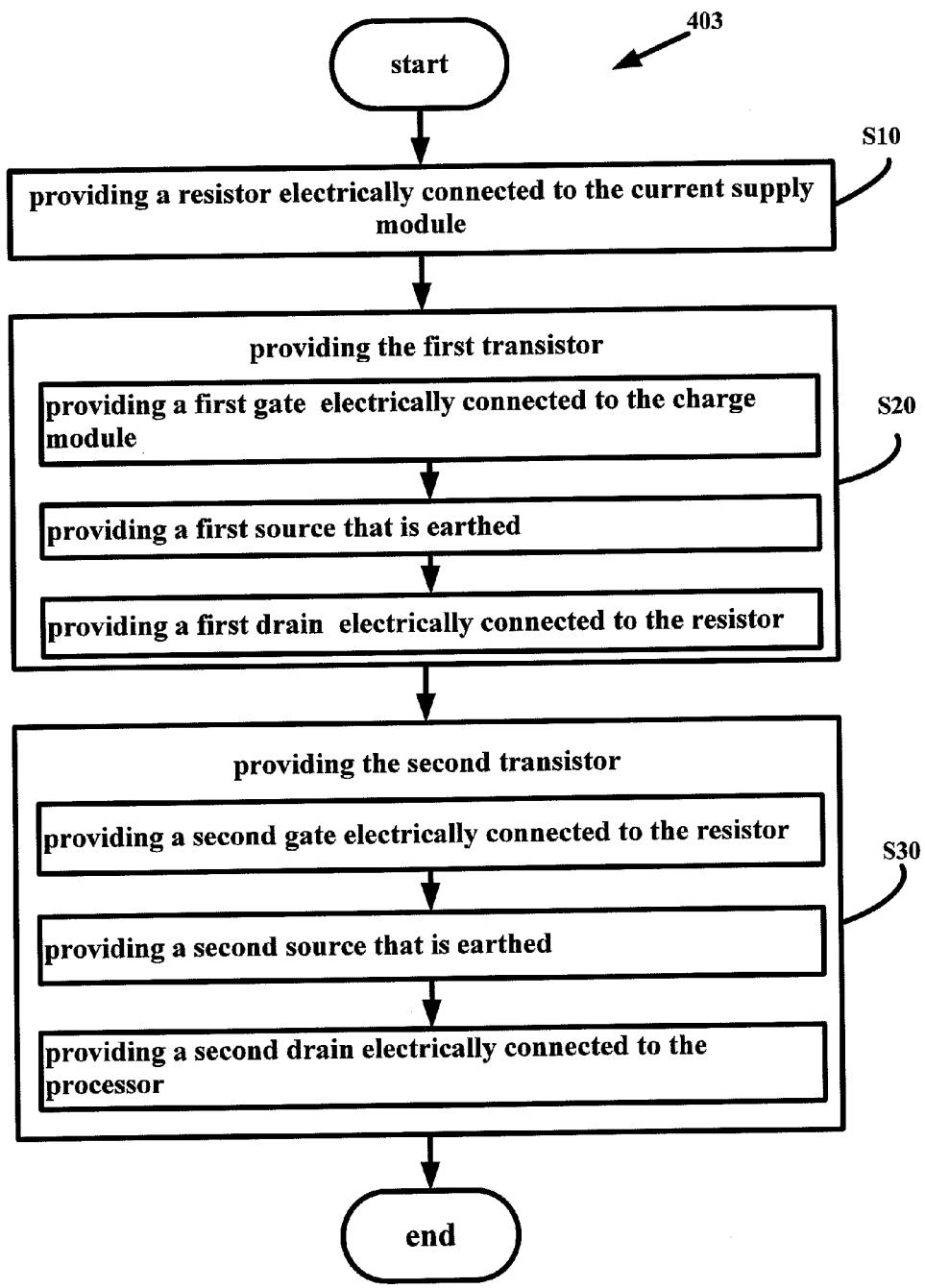
FIG. 5 illustrates a flowchart of the steps of providing the protection circuit according to the first embodiment of the invention.

Please refer to the FIG. 4 and FIG. 5 for the steps of the over-current method. FIG. 4 illustrates a flowchart of the steps of the over-current method of the invention; FIG. 5 illustrates a flowchart of the steps of providing the protection circuit according to the first embodiment of the invention.

In one embodiment of the invention, the over-current protection method of the invention is applied to the computer system 1, as shown in FIG. 1~FIG 3, wherein the computer system 1 includes a current supply module 90, a processor 80, and a battery 70. When the processor 80 enables the boost state, and generates a first current that is greater than a second current affordable by the current supply module 90, the over-current method of the present invention is applied to command the processor 80 to disable the boost state. It is to be understood that the over-current protection method of the present invention is illustrated in the computer system 1 in FIG. 1~FIG. 3; however, the over-current protection method of the present invention is not limited to the computer system 1 in FIG. 1~FIG. 3.

As shown in FIG. 4, in the first embodiment of the invention, the over-current protection method of the invention includes the steps of Step 401: providing the charge module which is for charging the battery is electrically connected to the current supply module.

Providing the charge module 10 electrically connected to the current supply module 90 and charging the battery 70 via the current generated by the current supply module 90.

Step 402: detecting the first current generated by the current supply module via the charge module when the processor enables the boost state; if the first current becomes greater than the second current affordable by the current supply module, stopping charging the battery and generating a signal.

As shown in FIG. 1, the charge module 10 includes a detection element 11 for detecting the first current under the boost state enabled by processor 80. If the first current becomes greater than the second current affordable by the current supply module 90, in order to protect the current supply module 90, the charge module 10 will stop charging the battery 70 to reduce the consumption of power, and generate a signal to command the processor 80 to disable the boost state.

Step 403: providing a protection circuit electrically connected to the charge module and the processor.

As shown in FIG. 1, the invention provides a protection circuit 20 electrically connected to the charge module 10 and the processor 80, for delivering the signal generated by the charge module 10 to the processor 80. As shown in FIG. 5, in the first embodiment of the invention, the steps of providing the protection circuit 20 includes:

S10: providing a resistor electrically connected to the current supply module.

As shown in FIG. 2, a resistor 21 is electrically connected to the current supply module 90, to reduce the current generated by the current supply module 90 for protecting the protection circuit 20.

S20: providing the first transistor.

As shown in FIG. 2, the steps of providing the first transistor include: providing a first gate 251 electrically connected to the charge module 10; providing a first source 253 that is earthed; and providing a first drain 255 electrically connected to the resistor 21.

S30: providing the second transistor.

As shown in FIG. 2, the steps of providing the second transistor 25 include: providing a second gate 251 electrically connected to the resistor 21; providing a second source 253 that is earthed; and providing a second drain 255 electrically connected to the processor 80.

Via the abovementioned steps, when the signal generated by the charge module 10 is transmitted to the first gate 231, the first transistor 23 is activated, allowing the second transistor 25 to be activated at the same time, such that the signal is transmitted to the processor 80 to command the processor 80 to disable the boost state. The activation and signal transmission mechanism of the first transistor 23 and the second transistor 25 are already disclosed in abovementioned embodiment, so there is no need for further description here.

Please continue to refer the FIG. 4 for Step 404: providing the control module electrically connected to the charge module and the processor.

After the step that the charge module 10 stops charging the battery 70 and generates a signal, and to execute the abovementioned Step 403, the present invention executes Step 404, providing the control module 30, and the control module 30 is electrically connected to the charge module 10 and the processor 80 for transmitting the signal to the processor 80, to command the processor 80 to disable the boost state. The difference between the protection circuit 20 and the control module 30 is that the protection circuit 20 is based on the hardware structure to work, and the control module 30 is based on the software to control the transmission of the signal. Therefore, if the computer system 1 breaks down or cannot work normally, the protection circuit 20 can still transmit the signal to the processor 80 to accomplish the over-current protection.

Step 405: transmitting the signal generated by the charge module to the processor via the protection circuit or the control module, to command the processor to disable the boost state.

When the processor 80 enables the boost state, and the first current is greater than the second current affordable by the current supply module 90 (which means the current is overloaded), the signal generated by the charge module 10 is transmitted to the processor 80 via the protection circuit 20 or the control module 30, to command the processor 80 to disable the boost state to accomplish the over-current protection. Because the protection circuit 20 and the control module 30 can transmit the signal respectively, both the protection circuit 20 and the control module 30 can accomplish the over-current protection for the computer system 1, allowing the computer system 1 to become safer.

Figure 6:
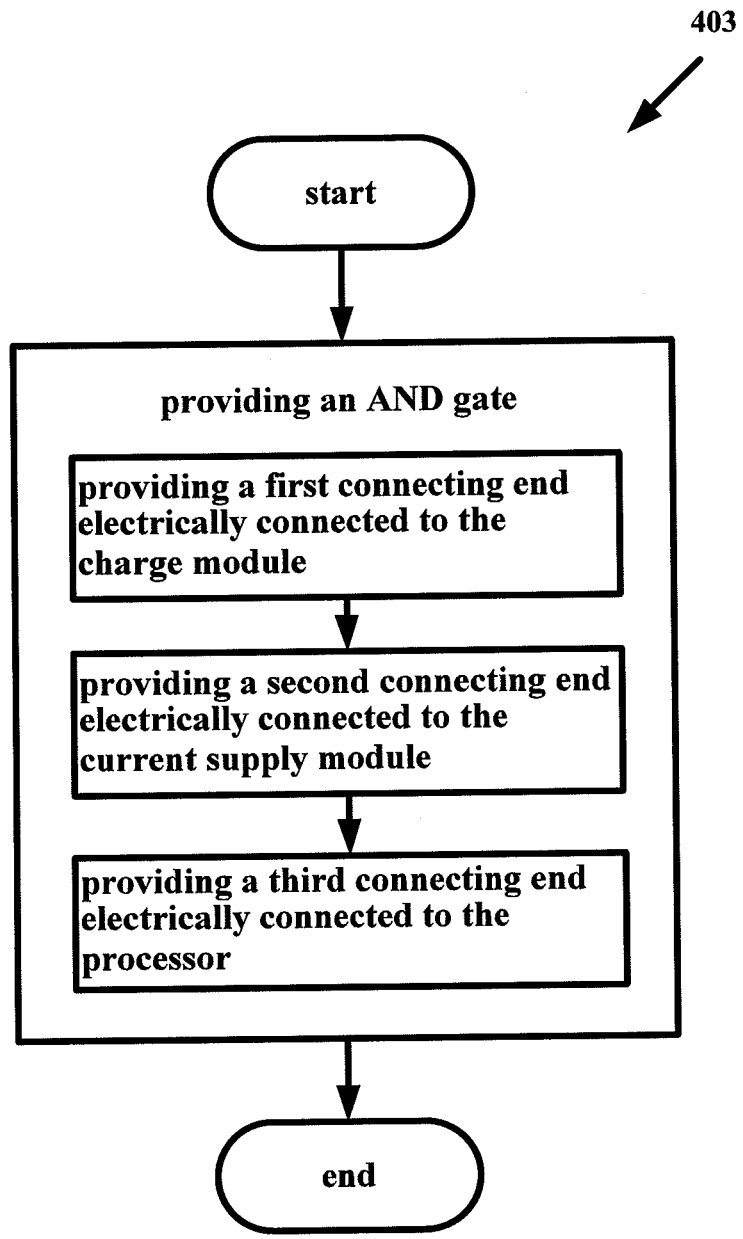
FIG. 6 illustrates a flowchart of the steps of providing the protection circuit according to the second embodiment of the invention.

Please refer to FIG. 6, which illustrates a flowchart of the steps of providing the protection circuit according to the second embodiment of the invention.

As shown in FIG. 6, the step of providing the protection circuit (Step 403) of the second embodiment is different from the first embodiment. As shown in FIG. 3, in the present embodiment, the step of providing the protection circuit of the present invention includes providing an AND gate 27, and the steps of providing the AND gate 27 include: providing a first connecting end 271 electrically connected to the charge module 10; providing a second connecting end 273 electrically connected to the current supply module 90; and providing a third connecting end 275 electrically connected to the processor 80. Via the abovementioned steps, when the signal is transmitted to the first connecting end 271, the AND gate 27 is activated, allowing the third connecting end 275 to transmit the signal to the processor 80, to command the processor 80 to disable the boost state. Because the mechanism of the AND gate 27 is disclosed in an abovementioned embodiment, and the steps of the present embodiment are the same as the first embodiment, there is no need for further description here.

It is noted that the above-mentioned embodiments are only for illustration. It is intended that the present invention cover modifications and variations of this invention provided they fall within the scope of the following claims and their equivalents. Therefore, it will be apparent to those skilled in the art that various modifications and variations can be made to the structure of the present invention without departing from the scope or spirit of the invention.

What is claimed is:

1. An over-current protection system applied for a computer system, wherein the computer system comprises a current supply module, a processor and a battery; the over-current protection system commands the processor to disable its boost state if a first current generated by the current supply module under a boost state enabled by the processor becomes greater than a second current affordable by the current supply module; the over-current protection system comprising:
    a charge module electrically connected to the current supply module for charging the battery, and the charge module comprises a detection element used for detecting the first current generated by the current supply module under the boost state, and if the first current becomes greater than the second current affordable by the current supply module, the charge module stops charging and generates a signal; and
    a protection circuit electrically connected to the charge module; when the processor enables the boost state such that the first current increases and becomes greater than the second current affordable by the current supply module, the protection circuit will transmit the signal generated by the charge module to the processor, to command the processor to disable the boost state.

2. The over-current protection system as claimed in claim 1, further comprising a control module electrically connected to the charge module and the processor, and the control module used for transmitting the signal to the processor, to command the processor to disable the boost state.

3. The over-current protection system as claimed in claim 2, wherein the protection circuit comprises:
    a resistor electrically connected to the current supply module;
    a first transistor comprising:
        a first gate electrically connected to the charge module;
        a first source which is earthed; and
        a first drain electrically connected to the resistor; and
    a second transistor comprising:
        a second gate electrically connected to the resistor;
        a second source which is earthed; and
        a second drain electrically connected to the processor;
    whereby, when the signal is transmitted to the first gate, the first transistor is activated, allowing the second transistor to be activated at the same time, such that the signal is transmitted to the processor to command the processor to disable the boost state.

4. The over-current protection system as claimed in claim 2, wherein the protection circuit comprises an AND gate, and the AND gate comprises:
    a first connecting end electrically connected to the charge module;
    a second connecting end electrically connected to the current supply module; and
    a third connecting end electrically connected to the processor;
    whereby, when the signal is transmitted to the first connecting end, the third connecting end outputs the signal, allowing the signal transmit to the processor, to command the processor to disable the boost state.

5. A over-current protection method applied for a computer system, wherein the computer system comprises a current supply module, a processor, and a battery; the over-current protection method is applied to command the processor to disable the boost state if a first current generated by the current supply module under a boost state enabled by the processor becomes greater than a second current affordable by the current supply module; the over-current protection method comprising the steps of:
    providing a charge module for charging the battery and electrically connecting to the current supply module;
    detecting the first current generated under the boost state via the charge module, and if the first current becomes greater than the second current affordable by the current supply module, stopping charging the battery and generating a signal;
    providing a protection circuit connected electrically to the charge module and the processor; and
    transmitting the signal generated by the charge module to the processor via the protection circuit to command the processor to disable the boost state if the processor enables the boost state such that the first current increases and becomes greater than the second current affordable by the current supply module.

6. The over-current protection method as claimed in claim 5, wherein after the step in which the charge module stops charging the battery and generates the signal, the over-current protection method further comprises the step of:
    providing a control module electrically connected to the charge module and the processor for transmitting the signal to the processor, to command the processor to disable the boost state.

7. The over-current protection method as claimed in claim 6, wherein the step of providing the protection circuit further comprises the steps of:
    providing a resistor electrically connected to the current supply module;

providing a first transistor, which comprises the steps of:
- providing a first gate electrically connected to the charge module;
- providing a first source which is earthed; and
- providing a first drain electrically connected to the resistor; and providing a second transistor, which comprises the steps of:
- providing a second gate electrically connected to the resistor;
- providing a second source which is earthed; and
- providing a second drain electrically connected to the processor;

whereby, when the signal is transmitted to the first gate, the first transistor is activated, allowing the second transistor to be activated at the same time, such that the signal is transmitted to the processor to command the processor to disable the boost state.

8. The over-current protection method as claimed in claim 7, wherein the step of providing the protection circuit further comprises the steps of:

providing an AND gate, which comprises the steps of:
- providing a first connecting end electrically connected to the charge module;
- providing a second connecting end electrically connected to the current supply module; and
- providing a third connecting end electrically connected to the processor;

whereby, when the signal is transmitted to the first connecting end, the AND gate conducts, allowing the signal to be transmitted to the processor via the third connecting end, to command the processor to disable the boost state.

* * * * *